United States Patent [19]

Michl et al.

[11] Patent Number: 4,551,819
[45] Date of Patent: Nov. 5, 1985

[54] OPTICAL RECORDING METHOD AND APPARATUS UTILIZING POLYMERIC BIREFRINGENT MATERIALS

[75] Inventors: Josef Michl; Claudio G. Puebla-Ponce, both of Salt Lake City, Utah

[73] Assignee: University of Utah, Salt Lake City, Utah

[21] Appl. No.: 368,072

[22] Filed: Apr. 14, 1982

[51] Int. Cl.$^4$ .............................................. G11C 13/04
[52] U.S. Cl. .................................... 365/120; 365/121
[58] Field of Search ............... 365/120, 127, 124, 121, 365/122

[56] References Cited

U.S. PATENT DOCUMENTS 3,868,653 2/1975 Winter ................................ 365/121

OTHER PUBLICATIONS

J. Morgan, Introduction to Geometrical and Physical Optics, McGraw-Hill Book Company, Inc., Chapter 16 (1953).
R. A. Bartolini, H. A. Weikliem, and B. F. Williams, "Review and Analysis of Optical Recording Media", 15 Optical Engineering (No. 2) 99–108 (Mar.–Apr. 1976).
P. Kivits, R. de Bont, and J. van der Veen, "Vanadyl Phthalocyanine: An Organic Material for Optical Data Recording", 26 Applied Physics 101–105 (1981).
H. G. Craighead and R. E. Howard, "Microscopically Textured Optical Storage Media", 39 Appl. Phys. Lett., (No. 7) 532–534 (1981).
V. B. Jipson, and C. R. Jones, "Infrared Dyes for Optical Storage", 18 J. Vac. Sci. Technol. (No. 1) 105–109 (1981).
P. Kivits, and R. de Bont, "Laser Induced Melting and Superheating in Te and In Films for Optical Data Storage", 24 Applied Physics 307–310 (1981).
T. W. Smith, "The Role of Polymers in Optical Recording Media", 18 J. Vac. Sci. Technol. (No. 1) 100–104 (1981).
Advertising Brochure of Drexler Technology Corporation, 2557 Charleston Road, Mountain View, California, Entitled "Drexon Optical Memory Discs for Laser Recording and Archival Data Storage".
J. Drexler, "Drexon Optical Memory Media for Laser Recording and Archival Data Storage", 18 J. Vac. Sci. Technol., (No. 1) 87–91 (1981).
M. W. Goldberg and J. C. Cassidy, "Preheat-Aided Optical Disc Recording", 39 Appl. Phys. Lett., (No. 8) 583–585 (1981).
R. A. Bartolini, "Media for High Density Optical Recording", 18 J. Vac. Sci. Technol. (No. 1) 70–74 (1981).

*Primary Examiner*—Terrell W. Fears
*Attorney, Agent, or Firm*—Workman, Nydegger & Jensen

[57] ABSTRACT

An optical recording media as well as methods and apparatus for reading and writing on the novel media are provided. The novel media has the property of birefringence, and information is stored thereon by modifying the birefringence of the storage media at selected locations and leaving the birefringence of the storage media intact at other selected locations. Alternatively, information is stored by inducing birefringence onto the storage media only at selected locations. The information may be stored either in a binary format, or in a multi-level (or analog) format. In a birefringent material wherein birefringence is formed by stretching, a pulse from a focused laser is utilized to modify the birefringence at selected locations by the application of thermal energy. The recorded information is read by passing polarized light through the material and ascertaining whether the polarized light was modulated as it passed through the various selected locations. It is possible to read with the same laser used for writing by decreasing the power during the read step. Alternatively, various methods are described for rendering the media incapable of further recording of information.

13 Claims, 9 Drawing Figures

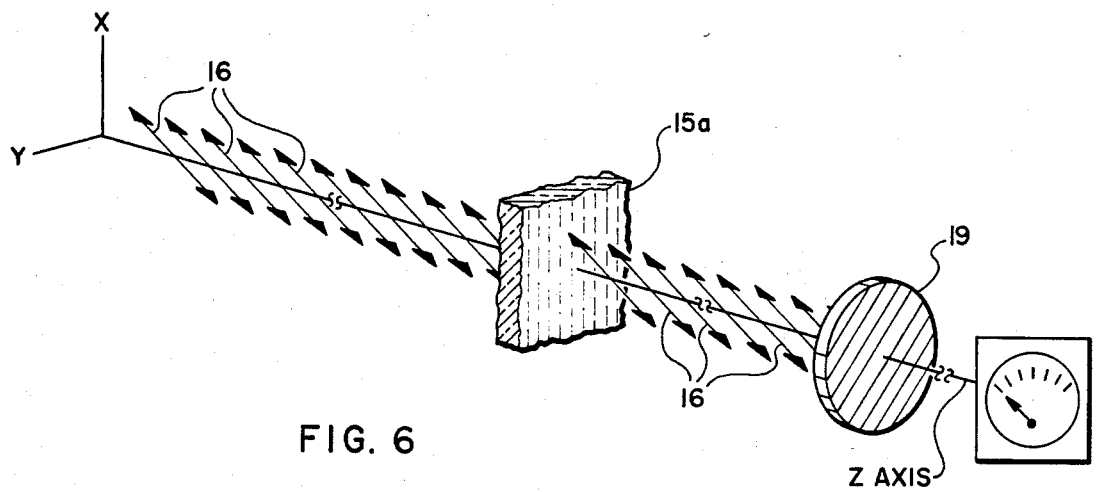
FIG. 6
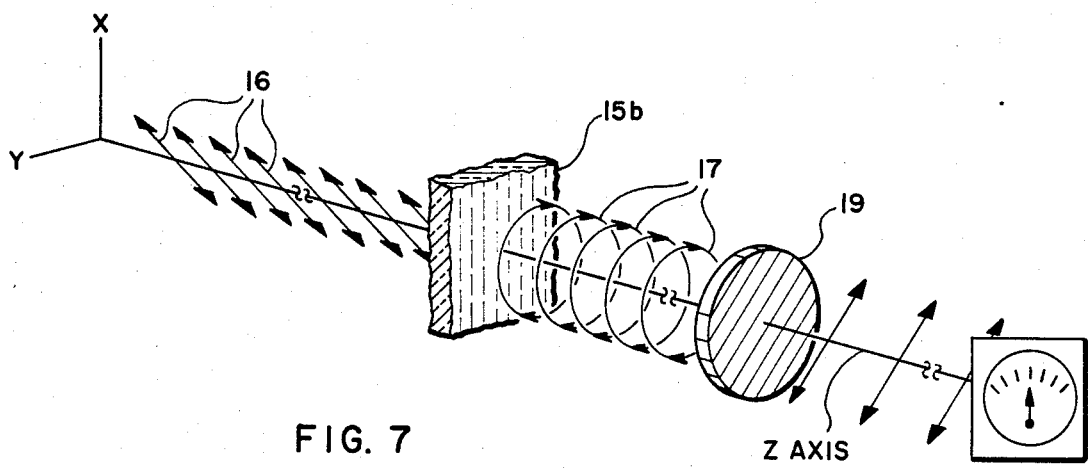
FIG. 7
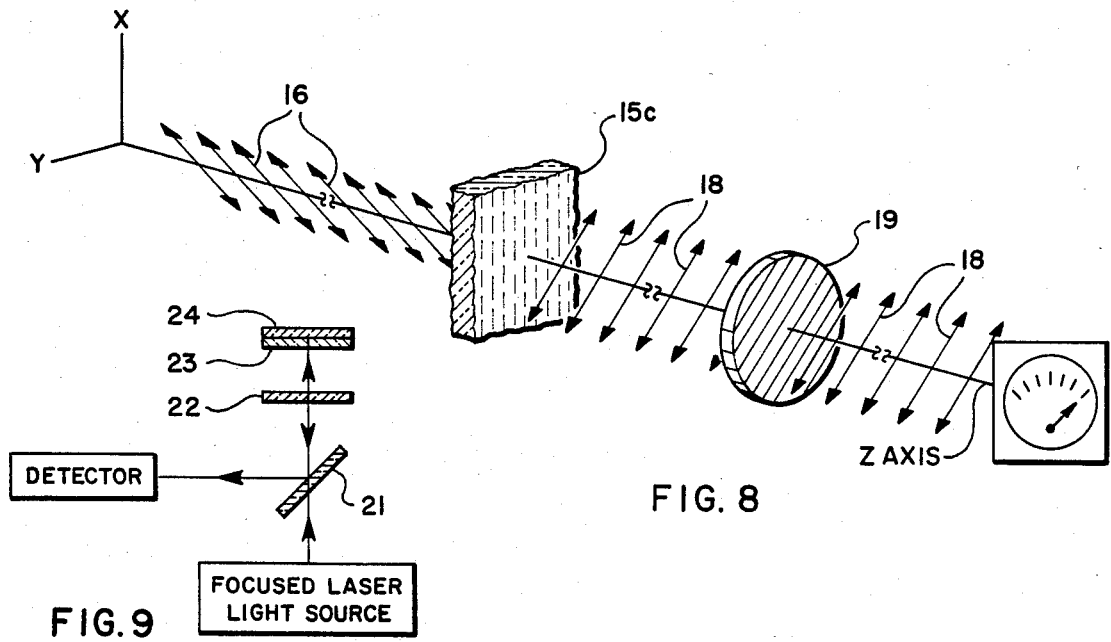
FIG. 8
FIG. 9

OPTICAL RECORDING METHOD AND APPARATUS UTILIZING POLYMERIC BIREFRINGENT MATERIALS

BACKGROUND

1. The Field of Invention

The present invention is generally directed to methods and apparatus for the optical recording of data. More particularly, the present invention relates to optical recording methods and apparatus utilizing materials having the property of birefringence.

2. The Prior Art

With the constant improvements in the field of computer technology, it has become necessary to improve the means by which data can be rapidly and accurately recorded and accessed. Furthermore, the increasing dependence upon computer generated and recorded information and data has created problems in storing the vast amounts of information and data which are now available. As a result, those skilled in the art have continued their search for recording media which are capable of high density data storage, and yet are amenable to high-speed writing and reading processes.

Additionally, in recent years, the development of the entertainment industry has led to a need for improved methods and media for storing audiovisual performances and the like. Indeed, a substantial market is developing around the sale and lease of entertainment-oriented videodisk and videotape products, thereby accelerating the investigation into such improved storage media.

Storage media are typically categorized into four general classifications: permanent storage media (on which information is recorded and then the media is rendered incapable of further recordation), permanent archival storage media (which is similar to permanent storage media except that it has a much longer lifetime), postable storage media (information can be subsequently recorded on the media after the initial recordation), and erasable media. It will be readily appreciated that with the ever expanding uses for storing data (including audiovisual presentations), the need for new and improved recording methods and media in each of these classifications is similarly increasing.

While an erasable medium may be considered to be the most versatile, that is not always the case. For example, with record keeping and information retrieval systems, erasability is rarely needed, and is generally even considered undesirable. In addition, for those uses where it is anticipated that a record may need to be updated, a postable storage medium is typically used so that a code may be added to the recorded information leading to the corrected record. In this way, the latest record is easily accessible, but the previous record is also available.

In the past, magnetic tapes or disks have been the common storage media for information and data. While such magnetic storage means have the advantage of being erasable, they also have the disadvantage of being relatively low-density data storage media. Accordingly, a great deal of attention has been directed towards the development of optical recording media, which are capable of a much higher density recording of information. Because most optical recording methods and media are not erasable, they have generally been used for archival storage of records, documents, music, pictures, motion pictures, or other information.

In general, optical recording media employ a focused laser to induce a chemical or physical change at the point of contact on the recording medium, thereby forming a "spot" about one micron in size. In order to "write" information, the information is first converted into a digital format. For instance, when utilizing a binary format, the information is converted into a format having two symbols, e.g., "on-off", "black-white", or "yes-no". By coupling electrical impulses having a binary format to a light beam modulator, it is possible to reproduce the "digitized" information as a set of light and dark spots on a photosensitive medium.

In order to "read" the information, the medium is scanned by a focused laser at low power, and the pattern of light and dark spots is observed to reconstruct the binary code, which in turn can be readily converted back to its original form.

Currently, eleven different classes of optical recording materials have been proven or are presently considered to be potentially useful (to varying degrees) in recording information: photographic films, photoresists, photopolymers, thermoplastics, photochromics, chalcogenide films, ablative thin films, magneto-optic, photoferroelectric, photoconductive/electro-optic, and electro-optic. Each of these are hereinafter discussed briefly.

Photographic films are prepared by placing a light-sensitive silver halide emulsion onto a rigid or flexible substrate. The recording process is photochemical in nature and results in an optical density change within the emulsion. A processing step, which is necessary before the data can be read, results in the appearance of a series of light and dark spots on the photographic films. The sensitivity and density of data storage on such photographic media are necessarily dependent upon and limited by the grain of the film.

The fact that photographic films must be processed after the information is recorded and prior to reading the information is a significant disadvantage. Not only does this additional processing step require additional time and facilities, but it also makes it impossible to read the information immediately after writing. It is considered very advantageous to be able to read immediately after writing because it is then possible to verify that the information was recorded correctly. Another disadvantage of photographic films is the fact that they have relatively low sensitivity. As a result, relatively long laser pulse durations are required for the writing step, thereby making the writing process relatively slow when these materials are used. Also, the relatively high costs of the fabrication of photographic films (especially of the extremely fine-grain films), as well as the additional development costs, militate against their use.

Photoresists are light-sensitive organic materials which, upon exposure and development, form image relief patterns. The readout process measures the difference in phase between light reflected from the the relief patterns in comparison to light reflected from the unexposed areas lacking the relief patterns. Again, a processing step is required prior to reading the relief patterns formed by the photoresists. Unfortunately, these materials are unstable to heat or light and, before recording, must be maintained in total darkness at very low temperatures. Moreover, these materials have a low sensitivity and thus require a slower writing process. As a result, these materials are currently unacceptable as a practical recording media.

Photopolymers are organic compounds capable of undergoing photochemical reactions when irradiated with light having a certain frequency. These photochemical reactions result in products having refractive indices substantially different from those of the starting material. Thus, the recorded data are read by observing the presence or absence of localized changes of the refractive index of the medium. A major difficulty with these materials is that if reading is done with the same laser which is used for "writing," even at every low power, additional writing on the recording medium will occur. Thus, for any practical use of such photopolymers, it is necessary to use a second laser wavelength for reading at a frequency that is not absorbed by the recording medium; it will be appreciated that the need for such a second laser wavelength substantially limits the versatility of such a system. Again, like many of the other systems, relatively low sensitivity is a problem with most photopolymers on which tests have been conducted.

Ablative thin films are currently the most widely used media for optically recording data. Such media utilize a thin film of a material capable of absorbing light at the desired frequency which is coated onto a substrate. The recording mechanism is essentially thermal in nature and utilizes the energy of an absorbed laser beam to either melt or actually ablate the material; the result is that dips or even holes are formed in the film. Readout can be either by means of reflection or transmission of light wherein the ablated holes or dips are used to modulate the intensity of a light beam.

Currently, the preferred material for use in these ablative thin films is tellurium. However, even tellurium is disadvantageous because of its high cost, and its instability in air over long periods of time. Moreover, the process by which a tellurium thin film is deposited on a substrate (such as a disk) is very complicated and time consuming; also, the process of forming a uniform thin film is very difficult. A major difficulty with all ablative thin films to data (although it has been minimized by use of tellurium) is the need for relatively large amounts of laser energy for writing.

Thermoplastic materials are prepared by forming a multi-layer structure consisting of a substrate, such as glass or mylar; a thin conductive layer, such as gold or silver; a photoconductor, such as polyvinylcarbazole sensitized with trinitro-9-fluorenone; and a thermoplastic. The recording technique consists of forming a uniform charge on the surface of the thermoplastic so that the voltage is capacitively divided between the photoconductor and the thermoplastic layers. Upon optical exposure, the photoconductor conducts at the points of illumination and thus discharges the voltage at that point. After exposure, the thermoplastic is heated so that the electrostatic forces deform the surface of the thermoplastic into a relief pattern which corresponds to the optically recorded information.

The advantage of using thermoplastic materials is that the information may be erased by additional heating so that surface tension smooths out the relief pattern. Reading is done in a manner similar to that used in connection with photoresists. However, these materials are disadvantageous because it has not yet been possible to achieve high-density recording of information and the materials developed to date have been prohibitively expensive.

A photochromic material is one which may exist in two or more relatively stable states having different optical properties and which may be switched from one state to the other by photon radiation. This change of state may result in either different absorption spectra or a difference in refractive index. This medium presently suffers from the problem of only being able to achieve a low sensitivity. These materials also suffer from the same disadvantages mentioned above in connection with photopolymers.

Chalcogenide materials reversibly switch between the amorphous and crystalline states upon heating, such as with a laser. Hence, data can be recorded in binary format by changing the state of the chalcogenide materials. Readout is accomplished by measuring differences in either reflection or transmission between the crystalline and amorphous states. The chalcogenides are of interest because they open up the possibility for erasure and recycling. However, they are currently of little practical significance because they are somewhat unstable, require relatively high laser power for writing, must be formed as a thin layer in a manner similar to the ablative thin films, and must be read with a second laser having a different wavelength than the writing laser.

Magneto-optic materials utilize differences in directions of magnetization to store information. A temperature rise in a localized area resulting from a focused layer reverses the local direction of magnetization. Readout is accomplished by utilizing either the Faraday effect for transmission readout or the Kerr effect for reflective readout. Again, this medium is one which may prove useful where erasure of the stored data is desired, although it has not yet been demonstrated to be workable.

A photoferroelectric medium is prepared by forming a photoconductor-ferroelectric sandwich. The photoconductor absorbs the light from a focused laser and induces switching between stable states of the ferroelectric material. In order to read stored information, it is necessary to utilize polarized light and crossed polarizers. The major drawback to the use of these materials has been the need to maintain an electric field to prevent erasing. Accordingly, these materials are impractical for use in any type of long-term informational storage.

Electro-optic materials rely upon the generation of electric fields by means of photoexcitation with resulting spatial rearrangement of electrons, which thus causes changes in the refractive index of the material. As discussed above, these localized changes in the refractive index can be "read." Unfortunately, it has not yet been demonstrated that these materials have practical application.

A photoconductive, electro-optic material is one that is both photoconductive and also exhibits a linear electro-optic effect. Such a material is sandwiched between insulating layers, and a voltage difference is maintained on the two insulating layers. Upon exposure, a redistribution of electric charge causes a retardation of light passing through the media. This retardation can be detected by the use of polarized light and crossed polarizers. Although such materials may be reused indefinitely, image storage with these devices is, unfortunately, limited to only a few hours.

From the foregoing, it can be seen that numerous methods have been devised or theorized for using a focused laser to induce some type of a localized change in a recording medium. The presence or absence of change at a given position on the medium serves as a binary code indicator. Conventional equipment is readily available to detect differences in the recording medium, whether those differences result in changes in optical density, refractive index, absorption spectra, magnetic alignment, phase retardation of light waves, and the like.

Several criteria are desirable in evaluating a particular medium. As mentioned above, ablative thin films are presently the optical recording medium of choice among the various types of optical recording media because, in comparison to the other types of media, ablative thin films do not require processing, have relatively high signal to noise ratios, and have relatively high optical absorption at the writing wavelength. Unfortunately, such ablative thin films are expensive to fabricate, require relatively high writing energy, and are not stable for long-term storage in an oxygen atmosphere.

Accordingly, it would be a significant advancement in the art of optical recording if a medium could be provided that utilizes a low writing energy, does not require processing, has a high signal to noise ratio and low bit error rate of written spots, has a long lifetime, and has low fabrication costs. It would also be extremely advantageous if a medium having these features could be read at the same wavelength used for writing.

BRIEF SUMMARY AND OBJECTS OF THE INVENTION

The present invention is directed to a novel storage material for use in recording information, and to methods and apparatus for reading and writing information thereon. In particular, the novel storage medium has the property of birefringence, and information is stored thereon by modifying the birefringence of the storage medium at selected locations, and leaving the birefringence of the storage medium intact at other selected locations. According to the present invention, only a small amount of energy is required to modify the birefringence, yet the recorded medium is stable.

As a result, information may be recorded according to a variety of digitized formats, including the conventionally available binary, octal and decimal formats. When using a binary format, for example, the presence of unmodified birefringence at a given location may be read as a "0", with the presence of modified birefringence at a selected location being read as a "1", or vice-versa. Additionally, unlike many of the prior art storage media, the medium of the present invention may be used to store information in an analog format.

The information thus recorded on the storage medium may be read by passing light having a known state of polarization through the storage medium and ascertaining the polarization of the light after it has passed through the medium at the various selected locations and determining whether the polarization of the light was modulated.

Storage methods and media of the present invention may be utilized for permanent or archival storage, and they may also be used as postable or erasable storage systems.

It is, therefore, a general object of the present invention to provide improved methods and apparatus for the recording of information and data in permanent, archival, postable, and erasable systems.

It is another object of the present invention to provide improved methods and apparatus for the optical recording of information having high sensitivities, thereby utilizing relatively low writing energies.

A further object of the present invention is to provide improved methods and apparatus for the optical reading of information that does not require processing before the recorded information is available for reading.

Still further objects of the present invention are to provide improved methods and apparatus for the optical recording of information that are capable of high-density storage of information, increased writing speed, and have a high signal-to-noise ratio and a low bit error rate.

Yet another object of the present invention is to provide improved methods and apparatus for the recording of information which utilize a recording medium which minimizes the fabrication costs and processes.

These, and other objects and features of the present invention, will become more fully apparent from the following description and appended claims taken in conjunction with the accompanying drawings.

BRIEF DESCRIPTION OF THE DRAWINGS

FIG. 6 is a schematic representation of linearly polarized light waves passing through an isotropic location in the birefringent medium and then being blocked by a polarizer crossed with respect to the polarization plane of the initial light wave.

FIG. 7 is a schematic representation of linearly polarized light waves becoming circularly polarized after passing through an anisotropic location in the birefringent medium having the characteristics of a quarter-wave plate and then being attenuated by a polarizer crossed with respect to the polarization plane of the initial light wave.

FIG. 8 is a schematic representation of linearly polarized light passing through an anisotropic location in the birefringent medium having the characteristics of a half-wave plate and then passing through a polarizer crossed with respect to the polarization plane of the initial light wave.

FIG. 9 is a schematic representation of an apparatus used for causing the reading laser beam to be reflected back through the birefringent material.

DETAILED DESCRIPTION OF THE INVENTION

Figure 1:
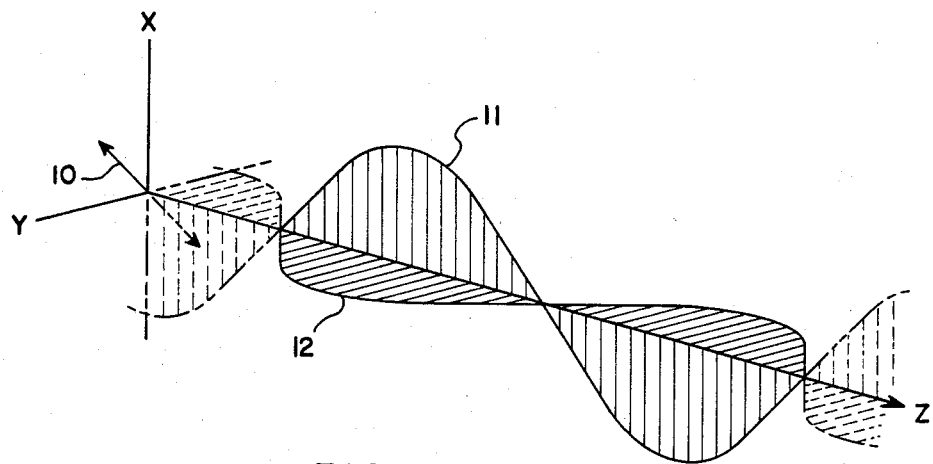
FIG. 1 is a perspective view of a light wave as represented on a Cartesian coordinate system, with the direction of propagation along the Z-axis.

The present invention is directed to the methods and apparatus for recording information onto a material (or "storage medium") which exhibits the physical property of birefringence. Heretofore, the property of birefringence has not been recognized as having a usefulness in connection with the optical recording of information. However, as is discussed in greater detail hereinafter, this property allows for the recording of information by inducing a localized change in the birefringent nature of the recording medium, such as upon exposure to a focused laser beam. Hence, the present invention can be utilized in connection with conventional equipment which converts information or data into a digital format and then utilizes that digital information to modulate the pulses of a laser beam. Moreover, the information recorded by the methods and apparatus of the present invention can be "read" by scanning the storage medium and detecting the presence or absence of change at a particular position and then using known technology to reconstruct the digital information.

GENERAL DISCUSSION

Birefringence is a term applied to certain anisotropic materials, that is, materials in which the observable properties of light change depending upon the direction (in terms of propagation and polarization) that the light travels through the materials. This is in contrast to isotropic materials in which the observable properties of light remain constant regardless of the direction of light travel.

In a "uniaxial" birefringent material, there is one direction, known as the optic axis, along which the material behaves like an isotropic material. It is possible to have anisotropic materials with more than one optic axis, and an isotropic material may conveniently be thought of as having an infinity of optic axes. Although any anisotropic material may be used in accordance with the present invention, the discussion herein will be restricted, for purposes of simplicity, to the use of uniaxial birefringent materials as they relate to the present invention.

An interesting property of a uniaxial birefringent material is that if a beam of light is directed through the light beam in any direction other than along the optic axis, the material will separate into two ways. One is generally called the ordinary ray (or the "O" ray) and the other is called the extraordinary ray (or the "E" ray). The velocity of the O ray will always be the same in a uniaxial birefringent material, while the velocity of the E ray will be different in different directions.

Furthermore, if a light beam is directed onto the birefringent material at an arbitrary angle with respect to the optic axis, the O ray and the E ray will be refracted to a different extent, thereby following a different path, as well as traveling at different velocities. However, if the beam is directed at an angle perpendicular to the optic axis, the two rays will travel along the same path although they will separate due to differences in their velocities. It is this latter property which is utilized in connection with the present invention.

When working with light, it is often convenient to define it in terms of three mutually perpendicular vectors, one being along the direction of propagation, and the other two used to define the orientation of the "electric vector" of the light, thus defining the plane of polarization. For purposes of understanding these light vectors, it is very useful to utilize a three-dimensional Cartesian coordinate system having X, Y, and Z axes as shown in FIG. 1.

As depicted in FIGS. 1-8, the direction of propagation of the light wave is shown as being along the Z-axis of the coordinate system. Although the plane of polarization of a single light wave may be in any plane containing the Z-axis, the electric vector may be mathematically represented at any given moment as the sum of two vectors, one along the X-axis and one along the Y-axis. Thus, as a wave propagates along the Z-axis, it may be defined as the coherent sum of two waves, one vibrating in the XZ plane and the other vibrating in the YZ plane.

Referring specifically to FIG. 1, a light wave having a plane of polarization 10 passing at an inclination between the X and Y axes may be represented by two waves 11 and 12 vibrating in the XZ and YZ planes, respectively. In the special case where the angle of inclination of light wave 10 is equal to 45 degrees with respect to the X and Y axes, the amplitude of waves 11 and 12 will be equal at any given point along the Z-axis. Moving the angle of inclination of wave 10 toward or away from the X-axis will result in wave 11 having an amplitude greater than or less than the amplitude of wave 12 at a given point along the Z-axis.

Figure 2:
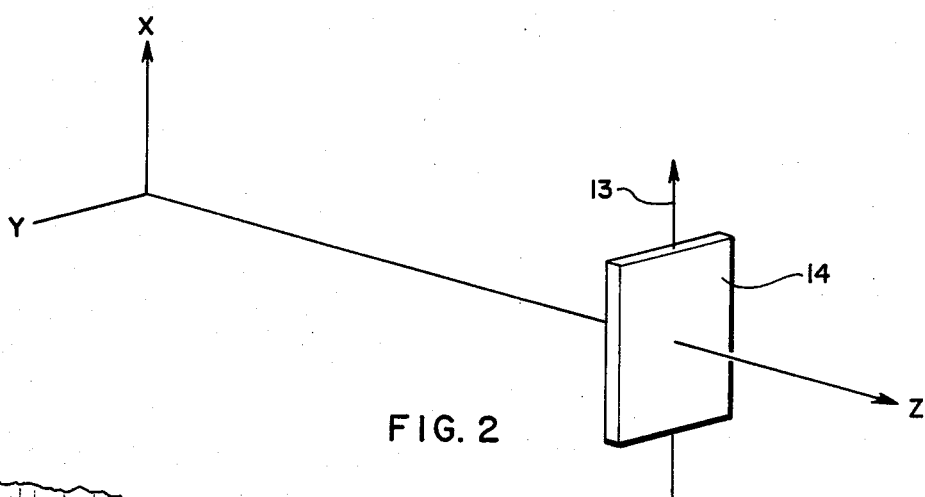
FIG. 2 is a perspective view of a uniaxial birefringent material lying in the path of propagation and having its optic axis aligned with the X-axis of the Cartesian coordinate system.

If the optic axis 13 of a birefringent material 14 is aligned with the X-axis of the Cartesian coordinate system, as depicted in FIG. 2, the mathematical model described above will represent reality; the O ray vibrates in the YZ plane, and the E ray vibrates in the XZ plane.

As mentioned above, in a birefringent material, the E ray travels at a different velocity (it may be either faster or slower) than does the O ray. Accordingly, a measure of the extent of birefringence is the difference in velocities between the two rays, or more conveniently, the difference between the indices of refraction along the XZ plane and the YZ plane. A mathematical equation may be derived that will describe the relative phase difference between the two rays:

$$\delta = \text{phase difference} = \frac{2 \cdot \pi \cdot d \cdot \Delta n}{\lambda}$$

where:
 d = thickness of the birefringent material
 $\Delta n$ = difference between the indices of refraction for linearly polarized light in the XZ and YZ planes, respectively; the measure of the extent of birefringence of the material
 $\lambda$ = wavelength of the light wave In this equation, the phase difference ($\delta$) represents the relative difference between the phase of the E and O rays after passing through the birefringent material. It will be seen that by increasing either the thickness (d) of the birefringent material or by increasing the difference between the indices of refraction ($\Delta n$) in the XZ and YZ planes, a larger phase difference between the two rays will result. This, of course, is expected since increasing the thickness of the birefringent material will allow the E ray to travel at a different velocity than the O ray for a longer distance, and increasing the difference in the two indices of refraction means that there is a larger difference in the velocities of the two rays.

With this knowledge, it will be appreciated that it is possible to adjust the extent of birefringence and/or the thickness of the birefringent material in order to obtain a phase difference between the two rays which is equal to one-quarter of the wavelength of the light wave. Such an optical element is called a "quarter-wave plate." Similarly, it is possible to produce a "half-wave plate," wherein the phase difference between the two rays is equal to one-half of the wavelength of the light wave.

In the special case where the incident beam 10 is linearly polarized with an angle of inclination of 45 degrees with respect to the XZ plane, the beam will be modulated so as to emerge from a quarter-wave plate as a circularly polarized beam. If the angle of inclination is at an arbitrary angle other than 45 degrees and/or the birefringent material is not a quarter-wave plate, the emergent beam will be elliptically polarized. In contrast, if such a linearly polarized beam is passed through a one-half wave plate, the beam will be modulated so as to emerge as a linearly polarized beam with an angle of inclination of 135 degrees with respect to the XZ plane, that is, it will be linearly polarized at a right angle to plane of polarization of the original beam.

In light of this background, the method by which birefringent materials can be utilized as an optical recording medium can be better understood. Birefringence is caused on a molecular level by a regular ordering (whether partial or complete) of molecules. If this regular ordering is disturbed in a localized area, thereby modifying the birefringence, polarized light passing through areas having birefringence will be affected differently than polarized light passing through an area with a different amount of birefringence. Hence, the basic requirement for recording binary-encoded information (i.e., the presence or absence of changes in a physical property at specific locations of a recording media) is present. As will be seen, the present invention also provides for use with other digital formats, or even an analog format.

There are several methods to induce birefringence in materials which are otherwise isotropic; these methods include, for example, stretching, special techniques of crystal formation, and applying shear stresses, an electric field, or a magnetic field. Although the following discussion is directed to the use of a material having birefringence induced by stretching, it will be understood that other methods and materials having birefringence may also be utilized within the scope of the present invention. For example, the use of an electric or magnetic field to induce birefringence would be useful in applications where it is desirable to have an erasable medium; adjustment of the magnetic or electrical field being used to restore birefringence to the entire surface of the media, thereby erasing the recorded information.

It is well known that linear birefringence may be induced into a polymer material by stretching at a controlled temperature; the more the material is stretched—the more birefringent it will become. When birefringence is induced by stretching, the optic axis will lie along the stretching direction. It is possible to determine experimentally the $\Delta n$ of a birefringent material in relation to the extent of stretching; for some materials, the $\Delta n$ has been reported in the literature. Once it has been determined the wavelength of light which is to be used in the reading process, it is a simple matter to determine what combination of $\Delta n$ and the thickness of the birefringent material is needed to form a quarter-wave plate or a half-wave plate, as discussed above.

THE "WRITING" PROCESS

When it is desired to record information (or "write") in a binary format, it is necessary to leave the birefringence undisturbed at locations where it is desired to record a binary "0" and to modify the birefringence where it is desired to record a binary "1" (or vice versa). The easiest means of doing this, at least in birefringent materials which have been formed by stretching, is to apply localized heat at the location on the material where it is desired to modify the birefringence. Such localized heat can be easily generated at the desired locations by use of, for example, a focused laser at a wavelength that will be absorbed by the recording medium.

While it will be appreciated that the laser may be used to produce such localized heat, it will be equally understood that other methods for inducing heat, such as bringing a heating element in direct contact with the birefringent material, may also be used. Moreover, other methods, apart from the application of heat, capable of modifying the birefringence at locations of the storage medium are also within the scope of the invention. Additionally, certain types of media may make it practical to induce birefringence selectively to various locations; such a system is also considered to be within the present invention. In this case, the absence of birefringence would be the normal state, while information would be recorded by inducing birefringence at the selected location. However, for the purposes of brevity, the discussion hereinafter will be limited to the thermal modification of birefringence by means of laser light.

Because of the necessity to heat localized areas of the medium (and thereby modify the birefringent character of the medium at that location), it is necessary to construct the medium so that it will absorb light at the writing wavelength.

Significantly, according to the present invention, it is not necessary to actually melt the recording medium or to burn a hole through it. (Nevertheless, it is also important to note that even if a hole were burned through the storage media, the process still works and records the information.) Moreover, as will be better understood from the following discussion, it is even unnecessary to totally remove all of the birefringence at the localized spots. Rather, it is only necessary to heat the localized position to a temperature sufficient to cause a measurable modification of the birefringence; this temperature may be termed the "annealing" temperature. Therefore, it is possible to utilize much less heat to make an observable change in the media of the present invention than was required by prior art media. This means that it is possible to utilize a laser at a lower power setting and/or with a shorter pulse. The fact that the present invention utilizes a shorter pulse is particularly significant since it means that it is possible to write much faster—an advantage earnestly sought after in computer applications.

In order to take maximum advantage of the relatively low amount of heat required to record on the birefringent medium, it is desirable to use media having a thickness (defined as "d" in the equation above) as small as possible. Utilizing a medium that is relatively thin requires less power to bring it to the annealing temperature than is the case for media having a greater thickness. Thus, it is desirable to utilize a material in forming the recording medium which has a large $\Delta n$ so that a quarter-wave plate or half-wave plate may be obtained with a very thin layer of the medium. Of course, it will be appreciated that the specific application may affect the desired thickness of the medium. For example, if a polymer is supported by a disk or other supporting substrate, the polymer can be very thin. However, if the polymer is to be self-supporting (as compared to magnetic tape), the polymer must necessarily have a certain minimum thickness.

As discussed above, in order to modify the birefringence at the localized areas, the light must be absorbed by the medium at the writing wavelength. This may be accomplished by utilizing a material that itself absorbs light at the writing wavelength. Alternatively, the recording medium may be constructed so that it contains a substance that absorbs light at the writing wavelength (called a "dye"). Such a dye can be incorporated into the medium substrate at the time the medium is formed so that the dye is distributed throughout the medium (this latter technique is called "doping"). Although the dye would preferably be distributed homogeneously throughout the medium, it should be understood that such a homogeneous distribution would not be necessary for many applications.

When the storage media is being used for the permanent archival storage of information, once the recording process is completed, there is typically no further need for the medium to absorb energy at the writing wavelength. Thus, it may be desirable to utilize a dye that is volatile so that it can escape from the medium following recording, or a dye which is bleachable by ultraviolet radiation or the like, or a dye that is altered by exposure to a chemical vapor (it is well known that ammonia vapor or iodine vapor may be used to alter certain dyes), or by similar methods of rendering the medium incapable of further absorption of light at the writing wavelength.

The removal of the dye from the medium after recording (and thus the ability to record further information on the medium) is extremely advantageous for two reasons: First, such techniques for removal or inactivation of the dye improve the permanency of the recorded information and prevent the possibility of unwanted recording. Second, these techniques optimize conditions for both reading and writing. The presence of the dye during reading allows for absorption of most of the light energy, and when the dye is removed from an otherwise transparent substrate, there is essentially total transmission during the reading process. Nevertheless, flexibility is retained because a dye can be reincorporated or reactivated at a later time, if it is desirable to perform further writing.

Alternatively, rather than changing the ability of the medium to absorb light, it may be desirable to merely improve the long-term stability of the medium so that much higher thermal energies are required to modify the birefringence; this can be accomplished by such techniques as exposing a medium formed of certain types of polymers to an effective amount of ionizing radiation so as to cause cross-linking between the long-chain polymer molecules.

Moreover, such cross-linking technique also improves the long-term stability of birefringent materials prepared by stretching by reducing any spontaneous loss of birefringence. After a material has been stretched to induce birefringence, there is a natural tendency for the material to return somewhat towards its original shape, thereby resulting in the loss of the birefringence property. By causing cross-linking between the long-chain polymer molecules, it is possible to overcome this tendency to return to the original shape and maintain the birefringence.

Another way of protecting the medium is by selecting a reading wavelength that is not absorbed by the medium so that no writing can possibly occur during reading. On the other hand, it should be noted that when a birefringent material having a sharp annealing temperature (as described below) is utilized, it is possible to use the same reading wavelength as was used for writing as long as the power of the reading laser beam is kept low enough to insure that the medium remains below the annealing temperature so as to avoid writing.

Depending upon the application of the present invention, it may also be desirable to utilize a material that has a very sharp annealing temperature, that is, the loss of birefringence occurs very rapidly at a discrete temperature. With such a sharp annealing temperature, essentially no modification of the birefringence will occur at a temperature slightly below the annealing temperature, and yet the required modification will occur substantially immediately upon raising the temperature to the annealing temperature. A recording medium formed of such a polymer will provide for a precisely measured pulse of given power and duration to record a readily reproducible "spot" of diminished birefringence.

THE "READING" PROCESS

The reading step is the process of determining what information has been recorded onto the birefringent medium. In general terms, the recorded information is "read" by passing a beam of light having a known state of polarization through the medium and determining if the polarization has been modulated as a result of its passage therethrough.

Figure 3:
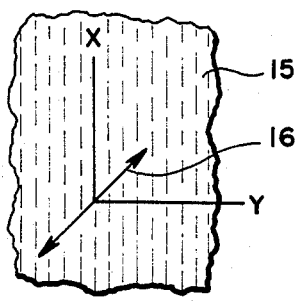
FIG. 3 is a plan view of a fragmentary section of birefringent material with a linearly polarized beam of light directed thereon with the plane of polarization at an angle of inclination with respect to the X- and Y-axes of the Cartesian coordinate system.

During the reading process, the greatest contrast will be realized when a focused, linearly polarized beam is directed onto the medium at an angle of incidence of 45 degrees with respect to the optic axis. In FIG. 3, a greatly enlarged view of a small section 15 of a birefringent medium is shown with the coordinate system superimposed over the spot where the linearly polarized beam 16 is directed. Beam 16 is depicted as a two-headed arrow centered on the Z-axis (which runs into the page) and bisecting the X- and the Y-axes, thereby denoting its wave characteristics and also its linear polarization. The X-axis or oriented parallel to the optic axis of the birefringent medium.

As explained above, linearly polarized light will not be modulated when passing through an isotropic area. Thus, if beam 16 in FIG. 3 is directed upon a position where birefringence has been removed during the writing step, both the E and O waves will travel at the same velocity, and the light will emerge from the bottom of the page as a linearly polarized beam with a polarization plane bisecting the X- and Y-axes.

Figure 4:
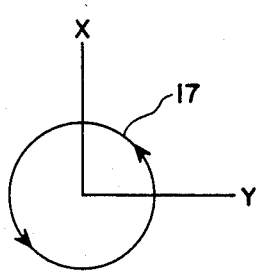
FIG. 4 illustrates the projection of the electric vector of the linearly polarized light of FIG. 3 after having been modulated by passage through a quarter-wave plate.

On the other hand, as explained above, if the beam 16 is directed upon a spot where the birefringence is still present, and if the medium constitutes a quarter-wave plate at the reading wavelength, the beam will emerge circularly polarized. This is depicted in FIG. 4, where the coherent sum of the waves in the XZ and YZ planes result in a vector whose end sweeps out the circle 17 illustrated in FIG. 4, so that the wave defines a spiral as it propagates along the Z-axis.

Thus, as seen in FIG. 6, if a polarizer 19 is oriented behind the birefringent media 15 at a right angle relative to the polarization direction of the beam 16 before it passes through the media, it is possible to easily determine whether birefringence was present or had been removed at that location. If the birefringence has been totally removed, as represented by material 15a in FIG. 6, the beam will remain linearly polarized and, therefore, will be completely blocked by the crossed polarizer. In contrast, as depicted in FIG. 7, if the birefringence is left intact, and if the material 15b constitutes a quarter-wave plate at the reading wavelength, about one half of the emergent circularly polarized beam will be passed. As a result, the recorded areas (where the birefringence has been removed) will show up as dark spots on a light field. The digitally encoded information may then be read in a conventional manner.

Figure 5:
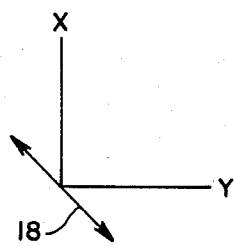
FIG. 5 illustrates the projection of the electric vector of the linearly polarized light of FIG. 3 after having been modulated by passage through a half-wave plate.

Note that the reading method just described results in the total blocking of the unmodulated beam, and a blocking of about one-half of the modulated beam. In order to improve the contrast between the light and dark spots, it may be desirable to utilize a half-wave plate in place of a quarter-wave plate. Thus, in FIG. 8, the birefringent material 15c constitutes a half-wave plate at the reading wavelength. After beam 16 passes through a half-wave plate, the E and O rays will be one-half wavelength out of phase; this results in a beam 18 linearly polarized at right angles to the original beam. (This polarization plane orientation is depicted in FIG. 5.) Thus, as shown in FIG. 8, the emergent beam 18 will be passed by polarizer 19, resulting in essentially complete transmission.

Inasmuch as FIG. 6 depicted a beam 16 passing through a location of the birefringent material where all birefringence had been removed, it can be seen that use of a birefringent material 15c exhibiting the characteristics of a half-wave plate results in optimum contrast.

It should be understood that the polarizer may be oriented parallel to the plane of polarization of original beam 16 rather than at a right angle thereto. When this is done, the unmodulated beam 16 will be completely passed by the polarizer and the modulated beam 18 will be completely blocked. Thus, maximum contrast is achieved.

According to the present invention, a quarter-wave plate can be made to act like a half-wave plate by placing a reflective surface behind the birefringent material in place of the polarizer 19. On reflection, the beam will once more pass through the medium at the selected spot. In positions where the birefringence has been removed, the light will once again emerge from the medium unmodulated. However, the circularly polarized beam will again separate into the E and O rays, and the E ray will once more travel with a different velocity than the O ray. Thus, upon reemergence, the E ray will have gained yet another quarter wavelength, putting it a full one-half wavelength out of phase from the O ray. In the same manner as when the beam 16 is passed through a half-wave plate (illustrated in FIG. 8), the result is a linearly polarized beam at right angles to the original beam. The use of such a technique has several practical advantages; the major advantage being that this configuration can be very compact in size.

Accordingly, if a crossed polarizer is placed in the path of the reemergent beam, there will be no transmission in areas where birefringence was removed, but total (i.e., nearly 100%) transmission where the birefringence was left intact. Thus, the recorded areas will show up as dark spots on a light field. Again, a polarizer oriented parallel to the plane of polarization of the original beam may also be used; this will result in the recorded areas showing up as light spots on a dark field.

An apparatus for accomplishing this latter reading method is depicted schematically in FIG. 9. As illustrated there, a focused laser beam is emitted at the reading wavelength and after passing through a partially-silvered mirror 21, is passed through a polarizer 22, preferably oriented at an angle of 45 degrees with respect to the optic axis of the birefringent material 23 so that it passes only linearly polarized light with that angle of inclination. The light beam then passes through the medium 23, reflects off of mirror 24, and returns along its original path. Again, the light beam is directed onto polarizer 22, which will pass light unmodulated by the birefringent material 23. Similarly, the polarizer 22 will block light which has been modulated so as to be linearly polarized at a right angle with respect to the polarization plane of the unmodulated beam. Light which passes through polarizer 22 will again strike mirror 21, although this time it is reflected by mirror 21, and thus directed to a detector.

An alternative arrangement to that depicted in FIG. 9 would be to aim the focused laser at a slight angle off of the perpendicular with respect to the birefringent material. When this is done, the beam, upon reflection, will travel on a slightly different return path. By selecting a proper angle, it is possible to achieve acceptable contrast while avoiding the need for a partially silvered mirror.

As mentioned above, it may be desirable to remove less than all of the birefringence since this would allow faster writing speeds. If less than all of the birefringence is removed during the writing step, then a beam 16 will not pass through the medium unmodulated. Rather, the E ray will travel faster than the O ray, but, upon emergence, there will be some arbitrary phase difference between the two waves. When this is the case, the emergent beam will be elliptically polarized. Nevertheless, by placing a polarizer in the path of the beam after it has passed through the birefringent material it will still be possible to identify locations where the birefringence was left intact from those where it has been modified.

It is important to appreciate that a useable system for reading the recorded information does not require a large amount of contrast between the light and dark spots; in fact, a contrast of even less than 10% is sufficient. This means that, while optimum contrast is achieved by use of a half-wave plate in the manner described above and by orienting a polarizer either crossed or parallel with respect to the plane of polarization of the original beam, it is possible to achieve acceptable contrast with any arbitrary retardation plate (i.e., not a half-wave plate), and with most arbitrary angles of orientation of the polarizer.

While the discussion up to this point has assumed that the optical recording medium constituted either a quarter-wave plate or a half-wave plate, it should be realized that 3/4, 5/4, 7/4, 9/4, ..., wave plates are equivalent to a quarter-wave plate, and 3/2, 5/2, 7/2, 9/2, ..., wave plates are equivalent to a half-wave plate. The use of media acting as a s/4 or as a s/2 wave plate, where s is an odd integer greater than 1, might be advantageous for certain applications. For instance, in certain circumstances, it would be possible to "erase" information recorded on the birefringent material by reexposing areas which were earlier exposed during the writing step in order to remove a sufficient amount of birefringence to make those areas a (s-2)/4 wave plate or a (s-2)/2 wave plate, respectively, thus making them indistinguishable from an area which had never been exposed, at least to reading apparatus constructed in the manner described above.

Although the discussion heretofore has been restricted to a method for reading and writing binary encoded information, it is also possible to record more than the two levels of information required to record binary encoded information, that is, it is possible to record information in more than merely "on-off", "light-dark", or "0-1" classifications. By recording more than two levels on a single location on the media, it is possible to store more information on the same piece of recording medium, i.e., achieve a higher density of storage. Such higher density storage is an extremely significant advantage of the present invention. Not only would this reduce storage space requirements, which can be very important, but it would also significantly speed up the reading and writing operations since fewer locations would need to be written or read to convey the same amount of information.

This multi-level recording (which may be octal, decimal, or the like, or even analog) may be done by taking advantage of the fact that it is not necessary to remove all of the birefringence in a particular location in order to distinguish that location from a location where the birefringence has been left intact. It is a simple matter to modulate the writing laser beam so as to record at different power intensities and/or different pulse-lengths so as to quantitatively remove different amounts of birefringence at different positions. Then, the amount of light passing through a crossed polarizer may be measured quantitatively in order to read information recorded by quantitative optical exposure.

It will be appreciated that when recording data quantitatively onto birefringent media, it may be desirable to use media constructed to different specifications than used to record qualitatively in connection with binary encoded information. For example, it would be advantageous to utilize media having a wide range annealing temperature so that there would be more control over the extent of annealing. Additionally, use of a medium having less birefringence (a lower $\Delta n$) and a greater thickness (d) so that more thermal energy would be necessary to effect smaller changes in birefringence would aid the quantitative recording of information.

Another feature which should be mentioned is the possibility of recording at different depths within the birefringent material. Thus, by adjusting the focus of the writing laser, it is possible to adjust the depth within the birefringent material at which most of the thermal energy is directed. Accordingly, it is possible to record in three dimensions where that is advantageous.

The principles discussed also have been verified by experiments; the following illustrative examples of those experiments serve to depict the practical application of birefringent materials as optical recording media.

EXAMPLE I

A sheet of polyvinylalcohol (PVA) containing a dye known as Acid Black 1 (having an absorption peak at about 61B nanometers) was prepared; thereafter, birefringence was induced by stretching the sheet to about four times its original length. The PVA sheet was irradiated with an unfocused Argon ion (Ar+) laser beam (having a wavelength of about 514.5 nanometers) for durations of between 5 and 20 seconds and power levels between about 20 to 25 milliwatts. For convenience, the results achieved by this example are discussed below together with the results of Example II.

EXAMPLE II

A piece of an ordinary polyethylene garbage bag was stretched about 800–900% and then irradiated by the same laser used in Example I. Because of the thinness and low melting point of this material, it was necessary to utilize a light shutter to provide a short laser pulse. It was found that when utilizing a shutter speed of one-eighth second with the unfocused laser beam, the power threshold necessary to modify birefringence without burning a hole was about nine milliwatts. Similarly, about twelve milliwatts of power was necessary in connection with a shutter speed of one-twelfth second. The "spots" of modified birefringence which were formed by the unfocused laser in this experiment had a diameter of about five microns.

When viewed between crossed polarizers, dark spots appeared at the locations that had been irradiated by the unfocused laser, thereby demonstrating methods for reading and writing binary encoded information through the use of birefringence modification. Significantly, it was also observed that the spots were darkest at their center and became progressively lighter away from the center. While this is easily explained by noting that use of an unfocused laser would result in a broad thermal gradient, its significance lies in the observation that different degrees of birefringence are observable quantitatively as locations having different intensities. These results are even more noteworthy in view of the fact that no attempt was made to form a half-wave plate.

From the foregoing, it can be seen that the present invention provides for advantageous methods and apparatus for the recording of information and data which utilize relatively low writing energies, since very little thermal energy is required to randomize the orientation of the molecules in recording medium, as opposed to melting or actually burning a hole in the storage material. Also, the present invention allows for immediate reading after writing, there being no requirement for any processing steps of the recording medium. In addition, the use of birefringence modification to record information allows for high-density storage of information, and a high signal-to-noise ratio and low bit error rate. Since readily available polymeric materials can be used as the recording media, it is readily apparent that the present invention provides for very low fabrication costs and yet remains very stable under normal operation conditions.

It is clearly seen from the foregoing that the present invention is extremely flexible and versatile. It can be embodied into essentially any form, e.g., a tape, a disk, or the like. As has been shown, it is very inexpensive to fabricate, and it is also inexpensive to store.

When using the medium in the form of a rotating disk, it is essential that the laser beam be oriented at a constant angle of inclination with respect to the optic axis of the birefringent medium. In order to achieve this, it is possible to place strips of the birefringent material on a disk substrate with the optic axis oriented radially, or to stretch the birefringent material radially. Alternatively, it would be possible to place a polarizer over the disk oriented at the desired angle with respect to the optic axis, and to rotate the polarizer along with the disk. When using this latter arrangement, a circularly polarized focused laser beam would result in the optimum amount of light passing through the polarizer and onto the birefringent material.

The present invention provides for extremely high sensitivity, yet allows for use by consumers as well as industry. It is possible to choose a polymer material having a high annealing temperature or to stabilize the polymer by inducing cross-linking so that it will be undamaged after prolonged storage in the glove compartment of an automobile. The birefringent material may be protected from damage, such as by scratching, by placing it between layers of some transparent protective material.

The stability desired (in terms of the storage period) may be obtained by choosing an appropriate polymer. Although the presently preferred polymers are polyvinylalcohol and polyethylene because of their ready availability, a great range of polymers may be used, recognizing that it may be necessary to incorporate a dye into certain polymers in order to cause absorption of light at the writing wavelength.

It is very significant that a great deal of time, effort and expense has been devoted to perfect the expensive prior art processes and materials mentioned above, and particularly the photographic processes and tellurium thin film processes. As has been seen, the present invention is at least as advantageous in many respects as these prior art processes and materials, and significantly more advantageous in other respects.

It should be realized that the present invention may be embodied in forms other than those specifically described herein without departing from the spirit or essential characteristics thereof. Thus, the described embodiments are to be considered in all respects only as illustrative and not restrictive. The scope of the invention is indicated by the appended claims rather than the foregoing description. All changes which come within the meaning and range of equivalency of the claims are to be embraced within this scope.

What is claimed and desired to be secured by United States Letters Patent is:

1. A method for semi-permanently recording information comprising the steps of:
   obtaining a birefringent polymeric material;
   selecting locations on the birefringent material where it is desired to record information; and
   irradiating the selected locations with electromagnetic radiation at a wavelength that is absorbed by the birefringent polymeric material in order to modify the birefringence of the material at said locations such that information is semi-permanently recorded onto the birefringent polymeric material.

2. A method for semi-permanently recording information as defined in claim 1 wherein a quantitative amount of electromagnetic radiation is directed at the selected locations of the birefringent material such that the birefringence is modified quantitatively at each such location.

3. A method for semi-permanently recording information comprising the steps of:
   inducing birefringence into a polymeric material;
   selecting location on the birefringent material where it is desired to record information; and
   irradiating the selected locations with electromagnetic radiation at a wavelength that is absorbed by the birefringent polymeric material in order to modify the birefringence of the material at said locations such that information is semi-permanently recorded onto the birefringent polymeric material.

4. A method for semi-permanently recording information as defined in claim 3 wherein a quantitative amount of electromagnetic radiation is directed at the selected locations of the birefringent material such that the birefringence is modified quantitatively at each such location.

5. A method for semi-permanently recording information as defined in claim 1, wherein the birefringent polymeric material contains a suitable dye capable of absorbing the electromagnetic radiation in order to record information.

6. A method for semi-permanently recording information as defined in claim 5, further comprising the step of removing the dye from the polymeric material after information has been recorded on the birefringent polymeric material so as to prevent further modifications to the birefringence of the polymeric material.

7. A method for semi-pemanently recording information as defined in claim 5, further comprising the step of inactivating the dye after information has been recorded on the birefringent polymeric material so as to prevent further modifications to the birefringence of the polymeric material.

8. A method for semi-permanently recording information as defined in claim 1, comprising the further step of irradiating the polymeric material with ionizing radiation capable of inducing cross-linking in the polymeric material after information has been recorded on the birefringent polymeric material so as to prevent further modifications to the birefringence of the polymeric material.

9. A method for semi-permanently recording information as defined in claim 8, wherein the polymeric material provided is a flexible material.

10. A method for semi-permanently recording information as defined in claim 9, wherein the polymeric material is configurated as a tape.

11. A method for semi-permanently recording information as defined in claim 10, wherein the polymeric material is configured as a flexible disk.

12. A method for semi-pemanently recording information as defined in claim 1, comprising the further step of further modifying the birefringence at selected locations by electromagnetic radiation in order to make such locations optically similar to locations where no modifications to birefringence have been induced in order to erase information recorded at such locations.

13. A method for semi-permanently recording information as defined in claim 12, comprising the step of recording new information onto the selected locations from which information has been erased.

* * * * *

UNITED STATES PATENT AND TRADEMARK OFFICE
CERTIFICATE OF CORRECTION

PATENT NO. : 4,551,819

DATED : November 5, 1985

INVENTOR(S) : Josef Michl et al.

It is certified that error appears in the above-identified patent and that said Letters Patent is hereby corrected as shown below:

```
Column  2, line 60, "the the" should be --the--
Column  3, line 12, "at every" should be --at very--
Column  3, line 42, "to data" should be --to date--
Column  7, line 44, "two ways." should be --two rays.--
Column 12, line  7, "insure" should be --ensure--
Column 12, line 42, "or oriented" should be --is oriented--
Column 18, line  1, "location" should be --locations--
Column 18, line 48, "claim 10" should be --claim 9--
```

Signed and Sealed this

Eleventh Day of March 1986

[SEAL]

Attest:

Attesting Officer

DONALD J. QUIGG

Commissioner of Patents and Trademarks